United States Patent [19]

Siegel

[11] Patent Number: 5,276,530
[45] Date of Patent: Jan. 4, 1994

[54] DOCUMENT REPRODUCTION MACHINE WITH ELECTRONICALLY ENHANCED BOOK COPYING CAPABILITY

[75] Inventor: Robert P. Siegel, Penfield, N.Y.

[73] Assignee: Xerox Corporation, Stamford, Conn.

[21] Appl. No.: 945,833

[22] Filed: Sep. 16, 1992

Related U.S. Application Data

[63] Continuation of Ser. No. 560,823, Jul. 31, 1990, abandoned.

[51] Int. Cl.$^5$ .............................................. H04N 1/00
[52] U.S. Cl. .................................... 358/406; 358/452; 358/443; 358/474; 355/55
[58] Field of Search ............... 358/443, 446, 449, 453, 358/463, 474, 475, 486, 488, 494, 406, 401, 495, 448, 452, 447, 471, 497; 355/55, 53; 250/201.2, 578.1

[56] References Cited

U.S. PATENT DOCUMENTS

| | | | |
|---|---|---|---|
| 3,635,557 | 1/1972 | Alderton | 355/65 |
| 3,807,856 | 4/1974 | Rodriguez | 355/67 |
| 3,924,066 | 12/1975 | Chapelle | 358/448 |
| 4,660,094 | 4/1987 | Yoshimoto et al. | 358/406 |
| 4,711,554 | 12/1987 | Nishimori | 355/8 |
| 4,763,173 | 8/1988 | Harrigan et al. | 355/52 |
| 4,806,775 | 2/1989 | Uchida | 358/494 |
| 4,812,881 | 3/1989 | Kumamoto et al. | 355/77 |
| 4,845,530 | 7/1989 | Matsukawa | 355/53 |
| 4,893,196 | 1/1990 | Koshiyouji et al. | 358/474 |
| 4,910,554 | 3/1990 | Noda | 355/208 |
| 4,980,720 | 12/1990 | Siegel | 355/223 |
| 5,105,075 | 4/1992 | Ohta et al. | 250/201.2 |

FOREIGN PATENT DOCUMENTS

0254869 12/1985 Japan ............... 358/474

Primary Examiner—Edward L. Coles, Sr.
Assistant Examiner—Jerome Grant, II
Attorney, Agent, or Firm—Oliff & Berridge

[57] ABSTRACT

A book copying system is disclosed which utilizes a height detector associated with the scan mechanism to obtain the distance between the image plane and portions of the image spaced from the image plane. Optical image data derived from scanning the original is converted to digitized electrical image information. A data processor calculates and/or utilizes correction factors for correcting the electrical image data for imaging mispositioning, image defocusing and loss of image illumination at the portion of the original image displaced from the image plane. Image compression is corrected by control of scan speed. Image illumination is also corrected by increasing the amount of illumination during scan of the portion of the original image displaced from the image plane. Correction of the electrical image data allows the use of less complex elements in the scanning mechanism. Correction signals can be developed during a prescan operation or in real-time scanning.

23 Claims, 2 Drawing Sheets

DOCUMENT REPRODUCTION MACHINE WITH ELECTRONICALLY ENHANCED BOOK COPYING CAPABILITY This is a continuation of application Ser. No. 07/560,823 filed Jul. 31, 1990, now abandoned.

BACKGROUND OF THE INVENTION

1. Field of the Invention

This invention relates to document reproduction, such as by xerographic copiers or printers and, more particularly to such equipment having enhanced capabilities for copying or scanning nonplanar originals, such as bound books and three dimensional objects.

2. Description of the Related Art

In reproduction machines, the copying of non-planar originals, such as bound books, presents a problem because it is difficult to copy the information adjacent the binding of the book. The difficulties of reproduction in the binding area results from the portion of the book adjacent the binding being lifted away from the original image plane, which is usually defined by a planar transparent plate. The quality of the reproduction decreases in relation to increasing distance of the original image from the image plane. The lack of clarity and/or distortion in the copy results from several factors including 1) the projected image becomes increasingly out of focus as the original is scanned in the central binding area; 2) the illumination becomes less than optimal in the spine area; 3) there is compression of the image data along the scan length; and 4) there is degradation of the definition of the image data resulting from the original image being disposed at an angle to the image plane.

Various approaches have been taken to minimize or eliminate these factors. A common "brute force" approach is to press the book against the surface of the platen to lessen or eliminate displacement from the platen surface of the binding. However, portions of the pages adjacent the binding area still remain a short distance above the platen surface. Consequently, information contained in these portions is out of focus on the output sheet. Moreover, attempts to press the binding area closer to the platen can result in breaking the binding of the book, especially older books, which have brittle bindings.

Another solution is to modify the platen to have a sloping edge portion so that the bound part of the book is placed in a corner position so that the entire surface of the page being copied is in intimate contact with the platen surface. An example of such a system is disclosed in U.S. Pat. No. 3,775,008. These systems have several disadvantages. The magnification range is limited because of restriction on scanner movement in the sloping corner edge. Also, copying capabilities are limited by the inability to employ a "split scan" scanning system, which allows both pages of a book to be placed on a platen and scanned without repositioning.

Another development is a system employing a height sensor on the scanner for determining the height of the original image above the platen. The height information is used to control the position of a scanning mirror to adjust visual image position, to adjust variable focusing, to control scan speed, and to control illumination. Such a system is disclosed in U.S. patent application Ser. No. 07/526,743 filed May 22, 1990, entitled DOCUMENT REPRODUCTION MACHINE WITH ENHANCED BOOK COPYING CAPABILITY and owned by the Assignee of the present application, the disclosure of which is herein incorporated by reference. Although the above mentioned system overcomes many of the shortcomings mentioned above, it requires the need for precise positioning of mirrors and precise controllability of focusing lenses and carriage speeds. These factors add to the complexity of the equipment and increase its cost.

OBJECTS AND SUMMARY OF THE INVENTION

It is an object of the invention to improve the photocopying of nonplanar original images, such as books.

It is a further object of the invention to combine the convenience and functionality of split scan scanning with the accuracy of book edge copying.

It is a further object of the invention to accomplish the foregoing objectives with minimum modification to an otherwise standard digital copier.

These and other objects are achieved, and the shortcomings discussed above are overcome, by the use of a scanning system which includes a detector for sensing the distance between the image plane and portions of the original image spaced from the image plane. Image information obtained by an optical scanner is converted to electrical image data. Correction factors for image placement, image compression, image focus and image illumination are derived from data from the height determining sensor, which may be stored as an image map. The electrical image data is modified in accordance with the correction factors to correct or clarify the electrical image data for the portion of the original spaced from the image plane. Image height data may also be utilized to control scan speed and illumination. The corrected/clarified electrical image data is then provided to downstream imaging and printing equipment.

BRIEF DESCRIPTION OF THE DRAWINGS

The invention will be described in detail with reference to the following drawings in which like reference numerals refer to like elements and wherein.

DESCRIPTION OF THE PREFERRED EMBODIMENT

Figure 1:
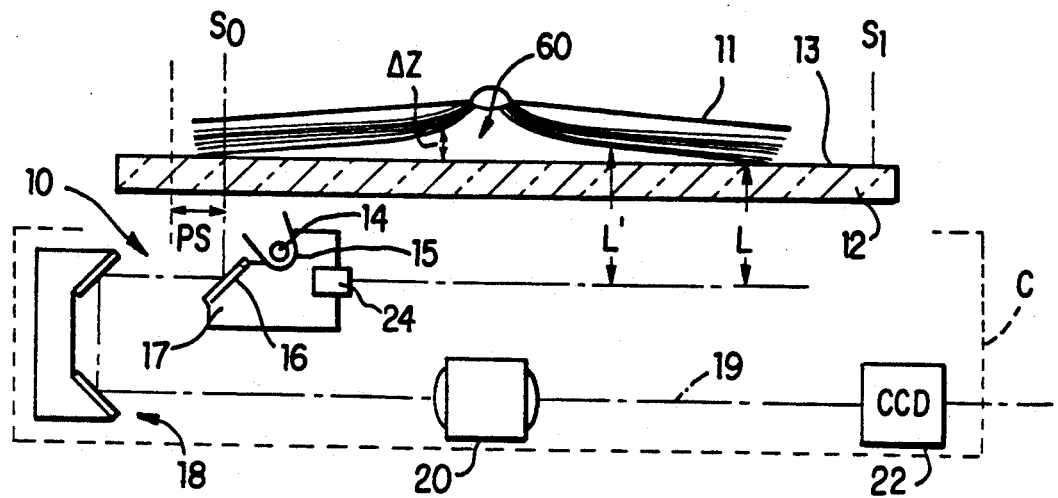
FIG. 1 is a side schematic view of a scanner, showing the scanning of a bound book.

Referring to FIG. 1, there is shown a scanning system 10 which is adapted to operate in a conventional document scan mode as well as a book copying mode. The system 10 is placed beneath a transparent image platen 12 which is usually of glass or other rigid transparent material. A book 11 is shown placed on the upper surface 13 of the platen 12. The upper surface 13 defines the image plane for originals placed on the platen 12.

The scanning system 10 includes a radiation source such as a lamp 14, mounted within a reflector 15. Radiant energy or light from the lamp 14 is reflected upwardly through the platen 2 and irradiates the original image placed on the platen.

The scanning system 10 also includes a scanning mirror 16 positioned to receive visible radiation reflected from the original image. The lamp 14, reflector 15 and mirror 16 may be mounted on a common housing 17.

The reflected optical image data received on scanning mirror 16 is directed via a suitable mirror assembly to an optical focusing assembly 20 which preferably is of a simple, fixed focus type. The lens assembly 20 focuses the optical image information into a beam 19, which is directed onto a suitable photosensor 22 which converts the optical image data of beam 19 into electrical image data. Known types of photosensors can be used, a preferred one being a charge coupled device (CCD).

The lamp 14, reflector 15, mirror 16, mirror assembly 18, lens assembly 20 and CCD 22 can be commonly mounted in a scanning carriage, represented in dotted line as C. The carriage C is adapted to move from left to right beneath the platen at preset or controllable scanning speeds. The scanning assembly undergoes a prescan excursion to the left prior to initiation of the scan exposure cycle with initial acceleration (and vibration damping) taking place in the prescan zone shown as PS. The start-of-scan position is identified as point $S_0$. The end of scan position is identified as $S_1$.

The scan assembly 10 also includes a height detector or sensor 24, preferably positioned to scan along an edge of an original, such as the pages of the book 11 placed on the surface 13 of the platen 12. Detector 24, in a preferred embodiment, incorporates a light emitting device, such as an LED and a light receiving device, such as a photodiode. The LED provides a constant radiation output directed upwards toward the platen 12 and the photodiode is positioned to receive the LED output reflected from the pages of the book 11. Such systems are utilized as auto-focus sensors in cameras and are suitable in this application. The detector 24 is energized during a book copying mode to scan the book and generate a varying output signal which represents the increase in object distance $\Delta Z$ (distance from platen surface 13 to book page) created by the book separation from the image plane, as at binding region 60. The output signals of the detector 24 are used by computer 30 to provide correction signals for image placement, focus, image compression and illumination, as will be explained below. When a book copying mode is entered, height detector 24 is activated and the measurements of the book page deviation from the platen ($\Delta Z$) are obtained either during a prescan operation or during real-time scanning. In the areas where the book is lying flat on platen 12, the distance L is the distance from the scan mirror to the platen surface 13. In the area where the book page is displaced from the platen surface 13, the distance L' is the sum of the distance L plus $\Delta Z$ at any particular location, for example as shown in FIG. 1. Thus the output of detector 24 is representative of $\Delta Z$ at any given point. The distance $\Delta Z$ will be 0 when the book page is flat on the platen and will rise to a maximum at the center of the book binding area. Detector 24 is shown located in the same horizontal plane as scan mirror 16, although it could be vertically translated with an appropriate offset distance used to obtain $\Delta Z$.

In a typical cycle of operation, the scanner assembly 10 begins to scan from the point $S_0$ from left to right. Lamp 14 can be decoupled if desired. As the scan progresses, output signals from the detector 24 are continuously generated and sent to position signal generation circuit 26 (FIG. 2) in which output signals are converted into a position signal proportional to the instantaneous value of $L + \Delta Z$. The output from position generation circuit 26 is sent to an analog to digital converter 28. The digital signal is then supplied to a processor 32 of the computer 30. The position signals are temporarily stored in memory unit 34 until the scan of both pages of the book is completed. At the end of the scan (position $S_1$) a complete height "profile" of the book, including approximation of the slope $dz/dx$ is then retrieved from memory 34 by the processor 32 and the information extracted as to the amount of correction required for image positioning, image focus, image compression and image illumination. Each of these corrections will be considered in further detail below.

The electrical image data signal from CCD 22 is converted by an analog to digital converter 28 and supplied to processor 32 of the computer 30. The correction factors discussed above, derived on the basis of signals from height sensor 24, are applied by the processor 32 to the electrical image data and the thus-modified image data is supplied to downstream processing means, such as image controllers and printers which utilize the modified electrical image data to produce output copies.

The focus of the image resulting from the portion of the image spaced from the image plane being beyond the depth of focus of the optical focusing arrangement of the scanner can be corrected by the application of suitable correction factors to the electrical image data. One means of providing this correction is to develop an empirical model for the depth of field characteristic of the particular imaging system used. This characteristic could be described as pixel spread as a function of distance from the nominal image plane. The appropriate correction factor as a function of distance from the image plane could then be stored in memory 34 in the form of a look up table. The appropriate factor is then used in conjunction with the height information from the image profile to modifying the spread image to approximate its original definition. Mathematical techniques for correcting image degradation by modification of the electrical image data are known and can also be implemented by programming processor 32 to perform the appropriate correction. Such techniques are shown in *Digital Image Processing*, Second Edition, R. C. Gonzalez and P. Wintz, Addison-Wesley Publishing Co.

Correction for image compression can be achieved by modification of the electrical image data on the basis of information from the height profile map. If the projected length of an image segment in the scan direction is $\Delta_X$ and the local slope is $\theta$, the corrected length of the segment is $\Delta_X/\cos \theta$. This stretches the image in the scan direction and projects the entire curved object surface onto the flat image plane. Such correction can be achieved by suitable programming of processor 32 to apply the correction factor to the electrical image data from CCD 22.

Figure 2:
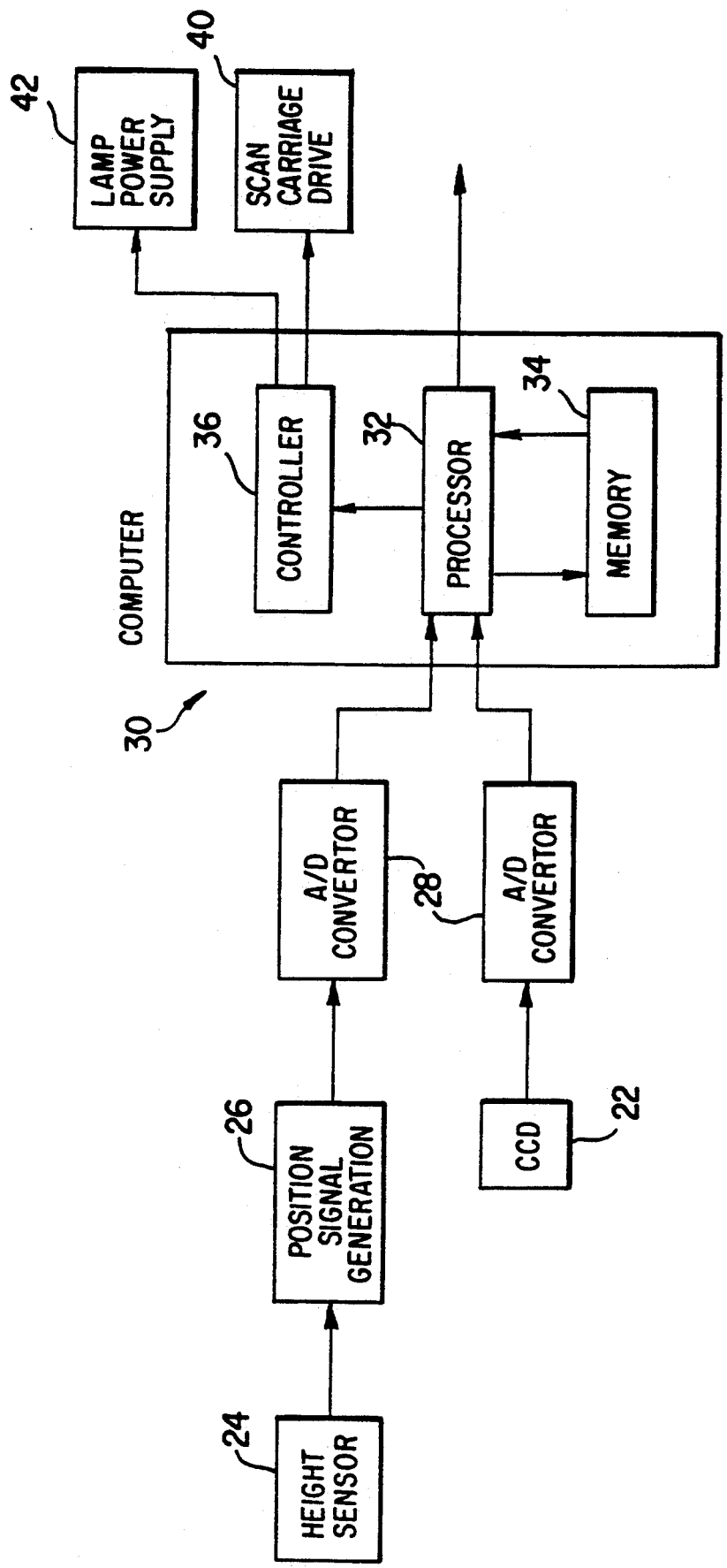
FIG. 2 is a block diagram of the scanning and control system.

Image compression resulting from the scanning of information from the angularly disposed spine portion 60 of the book can also be controlled by controlling the scan speed of the scanner assembly 10 as a function of the book profile such that the actual scan time (and thus the total number of pixels) will correspond to the true length of the page. Referring to FIG. 2, the processor 32 uses image profile information stored in memory 34 to provide an input to the controller 36. The controller 36 controls the speed of the scan carriage drive 40 to achieve this result. In this case, the portion of the scan for image information located in the portion of the image displaced from the image plane is slowed down by an amount proportional to the ratio of the projected length of that particular portion to the true length of that portion. This results in a constant image density across the page because the number of pixels collected by the CCD 22 per unit of true length remains constant. The calculation of the factor $\Delta\chi/\cos\theta$ can be implemented in processor 32 to derive control inputs for a controller 36 to change the speed of carriage drive 40. Suitable programming to provide control inputs for controller 36 is within the skill of a designer in this art and detailed disclosure thereof is unnecessary.

Referring to FIG. 1 and considering the necessity for illumination correction, it is evident that as the book page is displaced from the platen surface 13, there is an effective fall off of illumination (the output of lamp 14 is no longer normally incident on the page), as the page is moved away from the optimum illumination plane. Therefore, for some systems, it may be necessary to gradually increase and then decrease the lamp output during the scan. Under the control of suitable input from processor 32, controller 36 controls lamp power supply 42 to provide or compensate for the fall off in illumination.

Illumination correction can also be accomplished by use of a depth of illumination model similar to the depth of focus model described with respect to correction for the focusing. In such an arrangement, a suitable algorithm, programmed into processor 32, can be used to restore gray pixels to white pixels as directed by the model. The level of gray to white conversion would be dependent upon the particular $\Delta Z$ distance at each scan position. An empirically derived model could also be utilized. Such a model would be stored in memory 34 in the form of a look up table which provides a compensation factor dependent upon the measured $\Delta Z$. Other known mathematical techniques for correcting image degradation arising from illumination loss can also be implemented in processor 32.

Further, compensation for short fall in illumination in the region 60 could be accomplished by a combination of two of the above-described correction systems. For image information having a certain level of contrast, enhancement of the electrical image data by processor 32 could be utilized. In the portion of the image wherein the image goes to black, the illumination can be enhanced by increasing the amount of power supplied to the lamp 14. Switch over from one correction system to the other could be made on the basis of the height data stored in memory 34.

Figure 3:
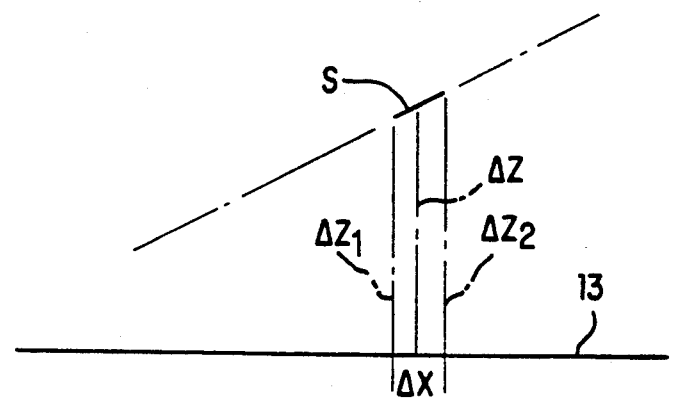
FIG. 3 is a diagrammatic illustration of focussing attributes of the system.

As previously noted, scan mirror 16 is mounted in a fixed position, ideally at approximately a 45° angle to the direction of scan. Referring to FIG. 1, the principle ray is reflected by the mirror assembly 18, through the lens assembly 20 onto the CCD 22 in a manner such that the path from the mirror 18 to the CCD 22 is essentially parallel to the image plane and the image is in focus on CCD. In this manner, the image information received at the CCD correctly represents the image data on the original. However, when the principle ray is reflected from a portion of the original that is spaced from the original image plane, the optical path that the image ray travels has changed by the amount $\Delta z$ and the optical image at CCD 22 has lost the focus set by lens 20 for the conditions of a flat image. However, the loss of optical focus can be compensated by modification of the electrical image information derived from CCD 22. Moreover the CCD presents a narrow optical window or "lens" across the scan direction. This factor tends to impart a property similar to improving the depth of field of the optical system comprising mirrors 16, 18 and lens 20. This is believed to enhance the focus of the system in at least portions of the region 60 where the image is lifted from the image plane. This latter effect is explained by reference to FIG. 3, which represents an enlarged view showing a pixel of image data S on a portion of the image lifted from image plane 13. For an increment of scan $\Delta x$, the edges of the pixel S are located differing distances $\Delta z_1$, $\Delta z_2$ from the image plane 13. The average distance $\Delta Z$ of the pixel from the image plane is determined by detector 24 and is used for deriving values for effecting enhancement of the electrical image data, as previously described. The loss of focus resulting from the change in optical path length represented by the difference between $\Delta z_1$, and $\Delta z_2$ is minimized by the inherent resolution of the system arising from the use of CCD 22, as previously described. Thus the system compensates for image deterioration resulting from the angular position of the image with respect to the image plane.

From the foregoing description, it can be seen that the prescan mode offers maximum functionality. The microprocessor 30 is fully programmed to accept inputs relating to the size of the copy paper, magnification, collation and simplex/duplex modes. All of these ancillary inputs can be entered following the prescan, but before the imaging scan begins. Also, at this time an appropriate split scan algorithm can be entered to enable each page of the book to be copied onto an individual sheet either in a simplex or duplex mode. The split scan technique would use the height sensor 24 to determine the spine area 60. Details of a split scan technique which can be implemented in the present invention by the microprocessor 30 are provided in U.S. Pat. No. 4,659,207, the disclosure of which is herein incorporated by reference.

The main disadvantage of the above described prescan mode is the loss of process time, i.e, the time taken to accomplish the prescan. An alternative method is to enable the detector 24 during the actual imaging scan to obtain the height profile "on the fly". In the disclosed system, this capability is enhanced because the correction factors can be derived almost instantaneously by the processor 32 and applied to the electrical image data supplied by the CCD. The sensor portion of the detector 24 must, for this mode, be able to discriminate from reflected light from the LED source and the reflected light from lamp 14. For some systems, it may be possible to use the reflected lamp light alone and dispense with the need for an independent light emitting source for the realtime scan mode. This would require the sensor 24 to be positioned so as to be in the path of the reflected light from lamp 14.

While the present invention finds greatest utility in book copying, its principles are applicable to other types of copying, e.g. three dimensional objects (as long as the height is limited and there is a constant at each scan position, i.e. $dz/dx = 0$) and heavily curled or folded documents.

While the invention has been described with reference to the structure disclosed, it will be appreciated that numerous changes and modifications are likely to occur to those skilled in the art and is intended to cover all changes and modifications which fall within the true spirit and scope of the invention.

What is claimed is:

1. A method for correcting reproduction from a nonplanar original image having a portion spaced from an image plane, comprising the steps of:

scanning the original image to develop electrical image data by focussing optical image data from the image on a photosensitive element;

determining the distance between the original image and the image plane in the portion where the original image is spaced from the image plane;

deriving a value representative of the loss of focus of image data from the portion of the image spaced from the image plane based upon distance determined in said determining step; and modifying the electrical image data in accordance with said derived value for correcting the electrical image data.

2. A method for correcting reproduction from a nonplanar original image having a portion spaced from an image plane, comprising the steps of:

scanning the original image to develop electrical image data;

determining the distance between the original image and the image plane in the portion where the original image is spaced from the image plane;

deriving a value representative of the image length of the original in the scanned direction in the portion of the image spaced from the image plane; and modifying the electrical image data in accordance with said derived value for correcting the image data.

3. A method for correcting reproduction from a nonplanar original image having a portion spaced from an image plane, comprising the steps of:

scanning the original image to develop electrical image data;

determining the distance between the original image and the image plane in the portion where the original image is spaced from the image plane;

deriving a value representative of the image length of the original in the scanned direction in the portion of the image spaced from the image plane; and modifying the electrical image data in accordance with said derived value for correcting the image data, wherein the step of modifying the image data comprises adjusting the image data according to the relationship:

*corrected length* $= \Delta x / \cos \Theta$ wherein for each scan interval $\Delta x$ is the projected length and $\Theta$ is the angle formed by a tangent to the scanned original and a line in the image plane parallel to the scan direction.

4. A method for correcting reproduction from a nonplanar original image having a portion spaced from an image plane, comprising the steps of:

scanning the original image with a radiant energy source;

deriving image data from radiant energy from said original image;

converting said image data to electrical image data;

determining the distance between the original image and image plane in the portion where the original image is spaced from the image plane;

deriving a correction value for the amount of radiant energy reflected from the portion of the original image spaced from the image plane; and modifying the electrical image data in accordance with said correction value for correcting the electrical image data.

5. The method of claim 4, and further comprising the step of increasing the radiant energy from the radiant energy source during scanning, in response to the distance determined in said determining step.

6. A method for correcting reproduction from a nonplanar original image having a portion spaced from an image plane comprising the steps of:

scanning the original image with a radiant energy source;

deriving optical image data from radiant energy from said original image;

converting said optical image data to electrical image data by directing said image data onto a photosensitive element;

determining the distance between the original image and the image plane in the portion where the original image is spaced from the image plane;

reducing the speed of the scan in the portion of the scan wherein the original image is spaced from image plane in accordance with the distance determined in said determining step;

deriving a corrected position value for correcting the positioning of image data in the scanned direction for image data scanned from the portion of the original image spaced from the image plane, based upon the distance determined in said determining step;

deriving a loss of focus correction value representative of the defocus of image data from the portion of the image spaced from the image plane based upon the distance determined in said determining step;

deriving an illumination correction value to compensate for a lessened amount of radiant energy reflected from the portion of the original image spaced from the image plane; and modifying the electrical image data in accordance with the corrected position value, the defocus correction value, and the illumination correction value.

7. Reproduction apparatus for reproducing an image having a portion spaced from an image plane comprising:

a planar imaging platen;

means for scanning an original image placed on the platen to produce electronic image data;

means for determining the amount of displacement of the original image from the platen; and means for modifying electrical image data produced by the scanning means in relation to displacement of the original image from the platen determined by the determining means, wherein the determining means includes mapping means for storing values of the displacement of the original image from the platen in relation to scan distance along the platen.

8. Reproduction apparatus for reproducing an image having a portion spaced from an image plane comprising:

a planar imaging platen;

means for scanning an original image placed on the platen to produce electronic image data;

means for determining the amount of displacement of the original image from the platen; and means for modifying electrical image data produced by the scanning means in relation to displacement of the original image from the platen determined by the determining means, wherein the scanning means comprises a scanning carriage and wherein the displacement determining means includes a sensor mounted on said scanning carriage.

9. Reproduction apparatus for reproducing an image having a portion spaced from an image plane comprising:
    a planar imaging platen;
    means for scanning an original image placed on the platen to produce electronic image data;
    means for determining the amount of displacement of the original image from the platen; and
    means for modifying electrical image data produced by the scanning means in relation to displacement of the original image from the platen determined by the determining means, wherein the modifying means comprises means for correcting for compression of said electrical image data in the portion of the original image spaced from the image plane.

10. Reproduction apparatus for reproducing an image having a portion spaced from an image plane comprising:
    a planar imaging platen;
    means for scanning an original image placed on the platen to produce electronic image data;
    means for determining the amount of displacement of the original image from the platen; and
    means for modifying electrical image data produced by the scanning means in relation to displacement of the original image from the platen determined by the determining means, wherein the scanning means comprises means for directing radiant energy toward the original image and means for receiving radiant energy from the original image; and wherein the modifying means includes means for determining a correction factor to compensate for a lessened amount of radiation received on the portion of the original image spaced from the image platen.

11. A method for correcting reproduction from a non-planar original image having a portion spaced from an image plane, comprising the steps of:
    scanning the original with a radiant energy source image with an optical element maintained at a fixed distance from the image plane;
    deriving image data from radiant energy from said original image;
    converting said image data to electrical image data;
    determining the distance between the original image and image plane in the portion where the original image is spaced from the image plane;
    deriving a correction value for the amount of radiant energy reflected from the portion of the original image spaced from the image plane; and
    modifying the electrical image data in accordance with said correction value for correcting the electrical image data.

12. Reproduction apparatus for reproducing an image having a portion spaced from an image plane comprising:
    a planar imaging platen;
    means for scanning an original image placed on the platen to produce electronic image data, said scanning means maintained at a fixed distance from said image plane during scanning;
    means for determining the amount of displacement of the original image from the platen; and
    means for modifying electrical image data produced by the scanning means in relation to displacement of the original image from the platen determined by the determining means.

13. A method for correcting reproduction from a non-planar original image having a portion spaced from an image plane, comprising the steps of:
    scanning the original image to develop electrical image data by focussing optical image data from the image on a photosensitive element, wherein said photosensitive element is maintained at a fixed distance from said image plane during said scanning;
    determining the distance between the original image and the image plane in the portion where the original image is spaced from the image plane;
    deriving a value representative of the loss of focus of image data from the portion of the image spaced from the image plane based upon distance determined in said determining step; and
    modifying the electrical image data in accordance with said derived value for correcting the electrical image data.

14. A method for correcting reproduction from a non-planar original image having a portion spaced from an image plane, comprising the steps of:
    scanning the original image with an optical element maintained at a fixed distance from the image plane to develop electrical image data;
    determining the distance between the original image and the image plane in the portion where the original image is spaced from the image plane;
    deriving a value representative of the image length of the original in the scanned direction in the portion of the image spaced from the image plane; and
    modifying the electrical image data in accordance with said derived value for correcting the image data.

15. Reproduction apparatus for reproducing an image having a portion spaced from an image plane comprising:
    a planar imaging platen;
    means for scanning an original image placed on the platen to produce electronic image data;
    means for determining the amount of displacement of the original image from the platen; and
    means for modifying electrical image data produced by the scanning means in relation to displacement of the original image from the platen determined by the determining means, wherein scanning means scans said original image along a linear scan path, and wherein the modifying means includes means for determining the slope of the portion of the original image spaced from the image plane at a plurality of locations along said scan path from displacement values provided by said determining means.

16. Apparatus as in claim 15, wherein the modifying means includes differentiating means.

17. Apparatus as in claim 15, wherein the modifying means includes means for storing a map of the displacement of the original image from the image plane along the scan path.

18. Reproduction apparatus for reproducing an image having a portion spaced from an image plane comprising:
    a planar imaging platen;
    means for scanning an original image placed on the platen to produce electronic image data;

means for determining the amount of displacement of the original image from the platen; and means for modifying electrical image data produced by the scanning means in relation to displacement of the original image from the platen determined by the determining means.

19. Apparatus as in claim 18 wherein the image data modifying means comprises means for correcting positioning of said electrical image data.

20. Apparatus as in claim 18, wherein the scanning means comprises means for directing radiant energy toward the original image, means for receiving radiant energy from the original; means for focussing radiant energy from the original image; and means for converting radiant energy from the focussing means to said electrical image data; and wherein said modifying means includes means for correcting the electrical image data for loss of focus of said radiant energy from the portions of the original image spaced from the image platen.

21. Apparatus as in claim 18, wherein the scanning means comprises a movable carriage, a light source for illuminating said image; a photo sensor mounted on said carriage; and means on the carriage defining an optical path for directing optical image data from image to the photo sensor.

22. Apparatus as in claim 21, wherein said light source is mounted on the carriage.

23. Apparatus as in claim 22, wherein the optical path defining means includes a fixed focus optical element for directing optical images to the photosensor.

* * * * *